Feb. 19, 1935.  R. W. MILLER ET AL  1,991,407
FISHING REEL
Filed April 23, 1934   2 Sheets-Sheet 1
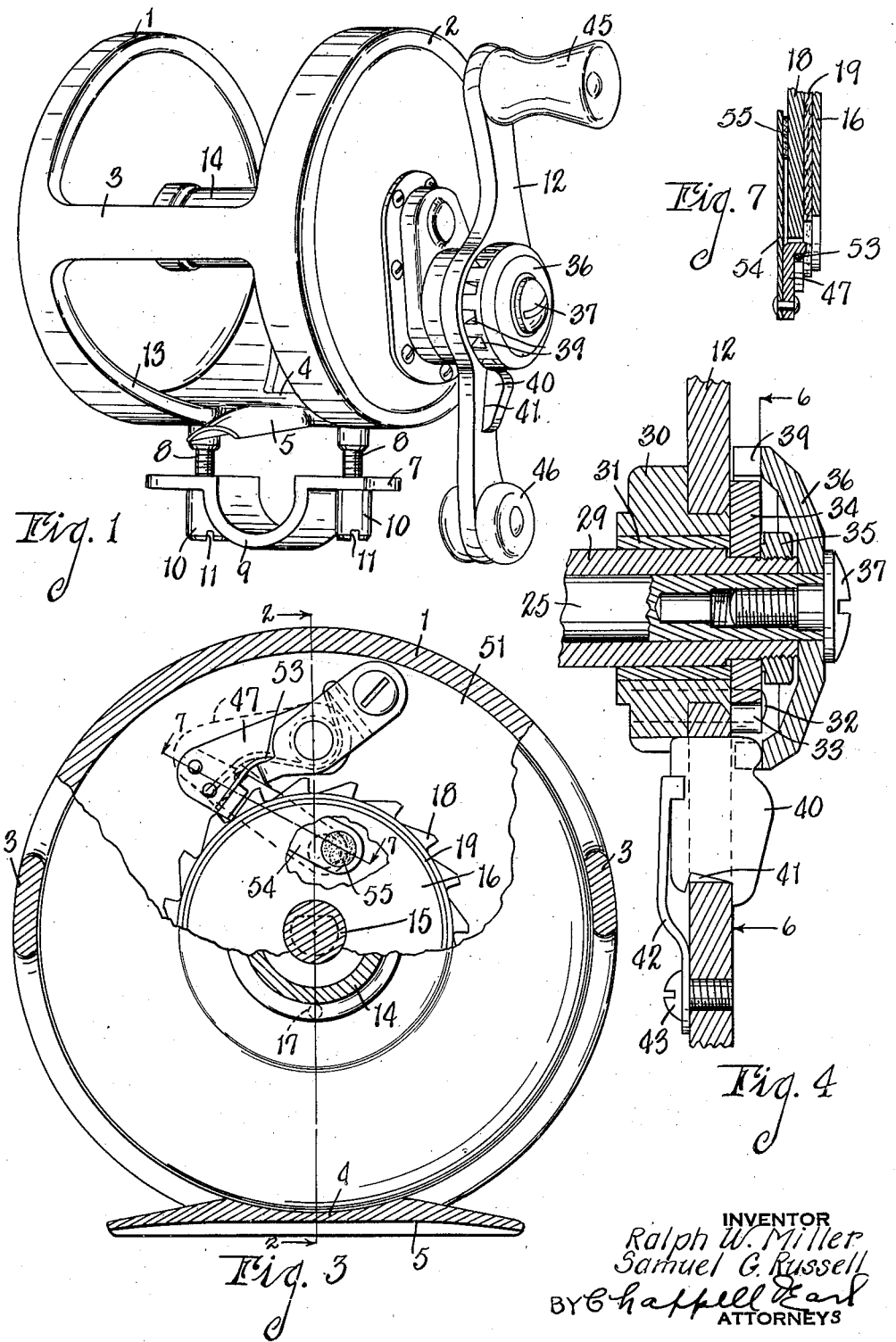
INVENTOR
Ralph W. Miller
Samuel G. Russell
BY Chappell Earl
ATTORNEYS

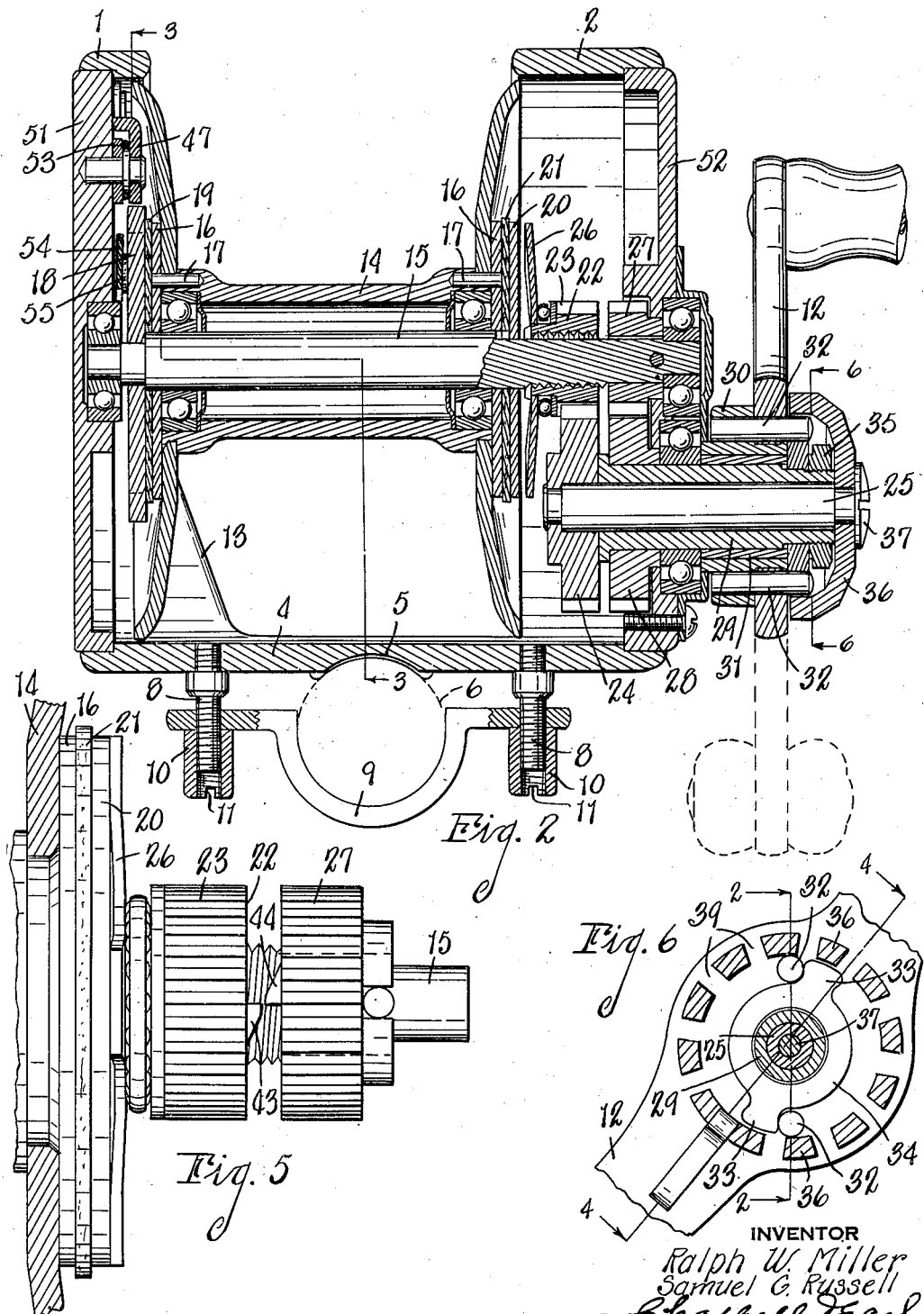

Patented Feb. 19, 1935

1,991,407

UNITED STATES PATENT OFFICE 1,991,407

FISHING REEL

Ralph W. Miller, Glendale, Calif., and Samuel G. Russell, Kalamazoo, Mich.; said Russell assignor, by mesne assignments, to said Miller Application April 23, 1934, Serial No. 721,950

20 Claims. (Cl. 242—84.5)

The main objects of this invention are:
First, to provide a fishing reel having improved means controlled through the crank for releasing the spool.

Second, to provide a fishing reel with spool braking means controlled through or by means of the crank.

Third, to provide a fishing reel having these advantages in which the braking action on the spool may be very quickly and easily regulated or adjusted.

Fourth, to provide a fishing reel having improved means for securing it to the fishing pole or rod.

Fifth, to provide a fishing reel having the above desirable features and characteristics and which is well balanced, simple and economical in its parts, very efficient and quite in operation and easy to manipulate.

Objects relating to details and economies of the invention will appear from the description to follow. The invention is defined and pointed out in the claims.

A structure which is a preferred embodiment of the invention is illustrated in the accompanying drawings, in which:

Fig. 1 is a perspective view of a fishing reel embodying the features of the invention.

Fig. 2 is an enlarged fragmentary view mainly in section on line 2—2 of Figs. 3 and 6.

Fig. 3 is a fragmentary view sectioned on line 3—3 of Fig. 2.

Fig. 4 is a fragmentary detail section on a line corresponding to line 4—4 of Fig. 6.

Fig. 5 is an enlarged fragmentary detail showing the coacting stops on the pinion and traveling clutch control nut for preventing a binding action between these parts when the nut is retracted.

Fig. 6 is a fragmentary transverse vertical section on a line corresponding to line 6—6 of Figs. 2 and 4, showing the lost motion connection between the crank and drive gear.

Fig. 7 is a detail section on line 7—7 of Fig. 3, showing the pawl release for noiseless operation.

The improvements of this invention are illustrated as they have been embodied in a large reel designed primarily for salt water or ocean fishing.

The frame comprises end members 1 and 2 connected by pillars or cross pieces 3 and 4, the bottom cross piece 4 carrying the reel seat 5. The seat 5 is conformed on its under surface to the contour of the fishing rod or pole indicated by the dotted line 6 in Fig. 2 and is elongated in the direction of the length thereof, the seat being curved upwardly between its ends to effectively grip the rod especially near such ends.

The seat 5 constitutes an upper clamp member arranged for coaction with a lower clamp member 7, the latter having holes loosely receiving the studs 8, 8 and a central portion 9 conformed to the contour of the lower portion of the rod 6. The studs 8 are threaded into the lower frame cross member 4 as illustrated and are provided at their outer ends with nuts 10, 10 for coaction with the clamp 7, the nuts having transverse slots 11 at their outer ends for the insertion of any handy tool or manipulating means, such as a coin, to tighten or loosen the clamp. This arrangement provides a very secure connection between the reel and the pole or rod which is a very desirable feature especially in large reels of this type.

The clamping means described above is preferably arranged so that the longitudinal axis of the fishing pole or rod passes through approximately the center of gravity of the reel. This makes it easier to handle the rod and reel and minimizes the twisting strain of balancing the assembly. The location of the crank 12 and the driving connection therefor to the spool at one end of the reel are partially counterbalanced by a web 13 connecting the bottom cross member 4 to the opposite end member 1. This web also serves to brace the end member 1 of the frame. The exposed parts of the reel are preferably formed of aluminum or a light aluminum alloy coated or treated so as to resist corrosion due to the action of salt water. The end member 2 is enlarged as illustrated to provide a gear housing for the parts connecting the crank 12 to the spool 14.

The spool 14 is rotatably mounted on the shaft 15, the latter being journaled at its ends in the tail plate 51 and the head plate 52. Ball bearings are used for the shaft and spool, as illustrated, so that the parts will rotate relative to each other with the least amount of friction possible.

The spool 14 is provided with a friction plate 16 at each end, these plates being held in position relative to the reel by means of pins 17. Rotation of the spool shaft 15 in reverse direction is prevented by the ratchet wheel 18 mounted on the outer end of the shaft and the coacting pawl 47 mounted on the end plate 51 of the frame. The ratchet wheel 18 constitutes a friction clutch member which coacts with the other friction plate 16 on the spool, there being a friction disk 19 disposed between the ratchet wheel and the friction plate.

A friction clutch member 20 is splined to the inner end of the shaft 15 for coaction with the inner friction plate 16 on the spool, there being a friction disk 21 disposed between these parts. The friction disks 19 and 21 are preferably formed of "Micarta," "Bakelite," or other suitable material. At the outer side of the clutch disk 20 a traveling nut 22 is loosely threaded to the shaft and provided with gear teeth 23 meshing with the gear 24 on the inner end of the control spindle 25. A spring thrust member or spider 26 is rotatably mounted on the inner end of the nut 22, a roller thrust bearing being disposed between these parts as shown. The spring thrust member 26 coacts with the friction clutch member 20 to establish a clutch and brake connection between the spool 14 and its shaft 15 when the traveling nut 22 is advanced to position to secure the desired amount of clutch or braking action.

The spool shaft 15 is provided with a driving pinion 27 meshing with the driving gear 28. This driving gear 28 is mounted on the inner end of the sleeve or tubular shaft 29 which is rotatably mounted in the head plate 52 by means of the ball bearing as shown. The control or spindle 25 is rotatably mounted in the shaft 29.

The hub 30 of the crank 12 is rotatably carried by the shaft 29, a bushing 31 being arranged between these parts. The crank 12 is keyed to its hub 30 by means of a pair of spaced pins 32 having their ends projecting outwardly for coaction with the pair of opposed radial driving lugs 33 of the disk 34 which is secured to the outer end of the shaft 29 by means of the nut 35. The lugs 33 and pins 32 thus coact to provide a lost motion connection between the crank 12 and its shaft 29. In the example illustrated, this lost motion is approximately 180° or a half-turn of the crank 12, this being sufficient to cause the clutch actuating nut 22 to travel the length of its stroke.

The adjusting member 36 for adjusting the relative position of the traveling nut 22 to change the braking effect of the friction clutch means is secured to the outer end of the spindle 25 by means of the screw 37. This member 36 is preferably a cap housing the pin and driving lug assembly and provided with a series of notches 39 for coaction with the detent 40 on the crank. The detent 40 is pivotally mounted in the slot 41 in the crank 12 and is actuated by the leaf spring 42 secured to the crank by the screw 43. With the parts thus arranged, the member 36 is adjusted by depressing the detent 40 and turning the member 36. After the adjustment, the detent 40 coacts with a selected notch 39 to hold the cap in adjusted position.

The clutch actuating nut 23 is prevented from binding or locking with the pinion 27 by the coacting stops 43 and 44 provided on these parts. These stops act to limit the movement of the nut 23 toward the pinion 27 and thereby prevent these parts from becoming locked together. The crank 12 is provided with the usual handle 45 and counterweight 46 at opposite ends thereof.

The forward rotation or line-winding rotation of the crank tightens or sets the clutch, thereby connecting the spool shaft 15 to the spool 14, the amount of friction, however, being determined by the adjustment of the member 36 and through it the nut 22.

With the parts thus arranged, the clutch action on the spool may be released by a rearward or reverse rotation thereof. As pointed out above, the amount of friction or drag may be easily adjusted by means of the member 36 which is positioned for very convenient manipulation. An advantage of the structure is that the stresses are all centered or embodied in the working parts and there are relatively minor stresses on the frame.

The ratchet wheel 18 acts to prevent reverse rotation of the spool shaft 15. Thus, when the line is being pulled out as by a fish, the clutch acts as a brake or drag, owing to the fact that the shaft is held stationary while the spool is reversely rotated. In paying out or casting the line, the spool is free and it may be freed at any time in playing a fish by a reverse movement of the crank. Therefore, the braking action of the clutch is under the direct control of the operator through the crank. Turning the crank toward its forward position results in a gradual increase of braking action until the maximum braking action, for which the adjustment is set, is reached. Turning the crank in the reverse direction results in a gradual decrease of braking action until "free spool" is reached, whereupon the crank stops and the spool is entirely free from the crank.

In large reels of this type, the operation of the ratchet produces an undesirable noise incident to the pawl, clocking over the ratchet teeth during the winding of the shaft 15. A feature of this invention is the prevention of such noise by the provision of means acting to automatically release the pawl from the ratchet during the winding of the shaft and to automatically re-engage the pawl with the ratchet when the shaft is stationary.

As shown by Figs. 3 and 7, the pawl 47 is urged into engagement with the ratchet wheel 18 by the spring 53, the pawl having a releasing member 54 mounted thereon and projecting alongside of the ratchet wheel. At its free end, the releasing member is provided with a friction pad or member 55 in contact with the ratchet wheel, so that the rotation thereof controls the position of the pawl. Thus, the pawl is automatically disengaged from the ratchet during the winding of the shaft and automatically re-engages when the winding is discontinued, thereby avoiding wear on the ratchet and the noise of the pawl clicking over the ratchet teeth.

We have illustrated and described our improvements in an embodiment which we have found very practical. We have not attempted to illustrate or describe other embodiments or adaptations, as it is believed this disclosure will enable those skilled in the art to embody or adapt our improvements as may be desired.

Having thus described our invention, what we claim as new and desire to secure by Letters Patent is:

1. In a fishing reel, the combination of a frame, a spool shaft rotatably mounted in said frame and having a ratchet wheel on its outer end and a pinion on its inner end, a spool rotatable on said spool shaft and having friction plates on its ends, the friction plate at its outer end coacting with said ratchet wheel, a pawl on said frame coacting with said ratchet wheel to prevent reverse rotation of said spool shaft, an inner spool shaft clutch plate axially and rotatably mounted on said spool shaft to coact with the friction plate on the inner end of the spool, friction disks rotatably mounted on said spool shaft between said spool and spool shaft friction plates, a clutch actuating toothed member loosely threaded on said spool shaft between said inner spool shaft friction plate and said pinion on said spool shaft, said pinion and clutch actuating member having coacting stops limiting the outward rotation of the clutch actuating member, a spring thrust member rotatably carried by said clutch actuating member for coaction with said spool shaft clutch plate, a tubular crankshaft mounted on said frame and having at its inner end a driving gear coacting with said spool shaft pinion and on its outer end a pair of driving lugs, a crank rotatably mounted on the outer end of said crankshaft and having a pair of opposed pins coacting with said driving lugs providing a lost motion connection between the crank and crankshaft, a spindle rotatably mounted in said tubular crankshaft and provided with a pinion on its inner end coacting with said clutch actuating member and an adjusting member on its outer end for said spindle, and means on said crank for holding said adjusting member in its adjusted position relative thereto.

2. In a fishing reel, the combination of a frame, a spool shaft rotatably mounted in said frame and having ratchet wheel on its outer end and a pinion on its inner end, a spool rotatable on said spool shaft and having friction plates on its ends, the friction plate at its outer end coacting with said ratchet wheel to prevent reverse rotation of said spool shaft, an inner spool shaft clutch plate axially and rotatably mounted on said spool shaft to coact with the friction plate on the inner end of the spool, a clutch actuating toothed member loosely threaded on said spool shaft for coaction with said spool shaft clutch plate, a tubular crankshaft mounted on said frame and having at its inner end a driving gear coacting with said spool shaft pinion and on its outer end a pair of driving lugs, a crank rotatably mounted on the outer end of said crankshaft and having a pair of opposed pins coacting with said driving lugs providing a lost motion connection between the crank and crankshaft, a spindle rotatably mounted in said tubular crankshaft and provided with a pinion on its inner end coacting with said clutch actuating member and an adjusting member on its outer end for said spindle, and means on said crank for holding said adjusting member in its adjusted position relative thereto.

3. In a fishing reel, the combination of a frame, a spool shaft rotatably mounted in said frame and having a ratchet wheel on its outer end and a pinion on its inner end, a spool rotatable on said spool shaft and having friction elements at its ends, the friction element at its outer end coacting with said ratchet wheel, a pawl on said frame coacting with said ratchet wheel to prevent reverse rotation of said spool shaft, an inner spool shaft clutch plate axially and rotatably mounted on said spool shaft to coact with the friction element at the inner end of the spool, a clutch actuating toothed member loosely threaded on said spool shaft between said inner spool shaft friction plate and said pinion on said spool shaft, said pinion and nut having coacting stops limiting the outward rotation of the nut, thrust means rotatably carried by said clutch actuating member for coaction with said spool shaft clutch plate, a tubular crankshaft mounted on said frame and having at its inner end a driving gear coacting with said spool shaft pinion, a crank mounted on the outer end of said crankshaft and having a lost motion connection therewith, a spindle rotatably mounted in said tubular crankshaft and provided with a pinion on its inner end coacting with said clutch actuating member and an adjusting member on its outer end for said spindle, and means for adjustably connecting said adjusting member to said crank.

4. In a fishing reel, the combination of a frame, a spool shaft rotatably mounted in said frame and having a ratchet wheel on its outer end and a pinion on its inner end, a spool rotatable on said spool shaft and having friction elements at its ends, the friction element at its outer end coacting with said ratchet wheel, a pawl on said frame coacting with said ratchet wheel to prevent reverse rotation of said spool shaft, an inner spool shaft clutch plate axially and rotatably mounted on said spool shaft to coact with the friction element at the inner end of the spool, a clutch actuating toothed member loosely threaded on said spool shaft for coaction with said spool shaft clutch plate, a tubular crankshaft mounted on said frame and having at its inner end a driving gear coacting with said spool shaft pinion, a crank mounted on the outer end of said crankshaft and having a lost motion connection therewith, a spindle rotatably mounted in said tubular crankshaft and provided with a pinion on its inner end coacting with said clutch actuating member and an adjusting member on its outer end for said spindle, and means for adjustably connecting said adjusting member to said crank.

5. In a fishing reel, the combination of a frame and spool, a rotatable spool shaft on which the spool is rotatably mounted, said spool shaft having a ratchet wheel at its outer end constituting a friction clutch member for coaction with the outer end of the spool, and a pinion at the inner end of the spool shaft, a pawl coacting with said ratchet wheel, a friction clutch member splined to said spool shaft for coaction with the inner end of the spool, a clutch actuating member threaded on said spool shaft for coaction with said friction clutch member, a crankshaft provided with a gear coacting with said pinion on said spool shaft and with a pair of driving lugs, a crank rotatably mounted on said crankshaft and having driving pins coacting with said lugs providing a lost motion connection between the crank and its shaft, a spindle disposed within said crankshaft and having on its inner end a gear coacting with said clutch actuating member and on its outer end an adjusting means, and means for adjustably connecting said spindle to said crank.

6. In a fishing reel, the combination with a frame and spool, of a rotatable spool shaft on which the spool is rotatably mounted, means for preventing reverse rotation of said shaft, a friction clutch driving connection for said shaft and spool including a threaded and toothed actuating member, a crankshaft having driving connection with said spool shaft, and a pair of radially disposed driving lugs, a crank rotatably mounted on said crankshaft and having driving pins coacting with said driving lugs and providing a lost motion connection between the crank and its shaft, a spindle disposed axially of said crankshaft for rotation therein and having on its inner end a gear coacting with said toothed clutch member and on its outer end an adjusting member, and means for adjustably connecting said adjusting member to said crank.

7. In a fishing reel, the combination with a frame and spool, of a rotatable spool shaft on which the spool is rotatably mounted, means for preventing reverse rotation of said shaft, a friction clutch driving connection for said shaft and spool including a threaded actuating member, a crankshaft having driving connection with said spool shaft, and a pair of spaced driving lugs, a crank rotatably mounted on said crankshaft and having driving pins coacting with said driving lugs and providing a lost motion connection between the crank and its shaft, a spindle in driving connection with said actuating member, and means for adjustably connecting said spindle member to said crank.

8. In a fishing reel, the combination with a frame, of a spool, a rotatable spool shaft on which said spool is rotatably mounted, means for preventing reverse rotation of said spool shaft, a friction clutch driving connection for said shaft to said spool, a toothed clutch actuating member threaded upon said shaft, a crankshaft having driving connection with said spool shaft, a crank having a lost motion connection to said crankshaft, a spindle disposed longitudinally of said crankshaft and provided with a gear meshing with said toothed clutch actuating member, and means for rotatably adjusting said spindle relative to said crank.

9. In a fishing reel, the combination with a frame and spool, of a rotatably mounted spool shaft, a pinion on said spool shaft, a friction clutch connection for said spool shaft and spool including an actuating member threaded on the shaft at the side of said pinion, said pinion and actuating member having coacting stops for limiting the travel of the actuating member toward the pinion, a crankshaft provided with a gear coacting with said pinion, a crank having a lost motion connection with said crankshaft and adjustably connected to said actuating member so that the clutch actuating member may be actuated to clutch engaging position by the forward movement of the crank and to clutch releasing position by the reverse movement of the crank, and means preventing reverse rotation of the spool shaft.

10. In a fishing reel, the combination with a frame and spool, of a rotatably mounted spool shaft, a pinion on said spool shaft, a friction clutch connection for said spool shaft and spool including an actuating member threaded on the shaft at the side of said pinion, a crankshaft provided with a gear coacting with said pinion, a crank having a lost motion connection with said crankshaft and adjustably connected to said actuating member so that the clutch actuating member may be actuated to clutch engaging position by the forward movement of the crank and to clutch releasing position by the reverse movement of the crank, and means preventing reverse rotation of the spool shaft.

11. In a fishing reel, the combination with a frame and spool, of a rotatably mounted spool shaft, a pinion on said spool shaft, a friction clutch connection for said spool shaft and spool including an actuating member threaded on the shaft at the side of said pinion, a spring thrust member rotatably mounted on said actuating member, there being a thrust roller bearing disposed between said thrust member and said actuating member, a crankshaft provided with a gear coacting with said pinion, a crank having a lost motion connection with said crankshaft and adjustably connected to said actuating member so that the clutch actuating member may be actuated to clutch engaging position by the forward movement of the crank and to clutch releasing position by the reverse movement of the crank, and means preventing reverse rotation of the spool shaft.

12. In a fishing reel, the combination with a frame, of a spool, a rotatable spool shaft on which said spool is rotatably mounted, means for preventing reverse rotation of said spool shaft, a friction clutch driving connection for said shaft to said spool including an actuating member adjustably mounted for varying the friction of the clutch when the actuating member is fully actuated, a crankshaft having driving connection with said spool shaft, a crank having a lost motion connection to said crankshaft, a spindle disposed longitudinally of said crankshaft and operatively connected to said clutch actuating member, and a member for rotatably adjusting said spindle relative to said crank.

13. In a fishing reel, the combination with a frame, of a spool, a rotatable spool shaft on which said spool is rotatably mounted, a friction clutch driving connection for said shaft to said spool including an actuating member adjustably mounted for varying the friction of the clutch when the actuating member is fully actuated, a crank having a lost motion connection with said crankshaft and adjustably connected to said actuating member so that the clutch actuating member may be actuated to clutch engaging position by the forward movement of the crank and to clutch releasing position by the reverse movement of the crank, and means preventing reverse rotation of the spool shaft.

14. In a fishing reel, the combination of a frame and spool, a rotatable spool shaft on which the spool is rotatably mounted, means for preventing reverse rotation of said spool shaft, a crank having a lost motion driving connection to said spool shaft, a friction driving connection for said spool shaft to said spool including an actuating member adjustably mounted for varying the friction or braking action of the clutch on the spool when the crank is rotated in the forward or spool driving direction, and an adjustable actuating connection for said clutch actuating member to said crank.

15. In a fishing reel, the combination of a frame and spool, a rotatable spool shaft on which the spool is rotatably mounted, means for preventing reverse rotation of said spool shaft, a crank having a lost motion driving connection to said spool shaft, a friction driving connection for said spool shaft to said spool, a clutch actuating member threaded upon said spool shaft, and an adjustable actuating connection for said clutch actuating member to said crank.

16. A fishing reel comprising a frame having a pair of spaced end members, one of which constitutes a gear housing, a spool disposed between said gear housing and the other end member, a crank on the outer side of said gear housing, means in said gear housing connecting said crank to said spool, cross members connecting said end members, the bottom cross member being connected to said other end member by a web constituting a counterbalance for said gear housing and parts associated therewith, and rod clamping means on said bottom cross member located near the center of gravity of the reel and including a curved upper clamp member conformed to the contour of the rod and elongated in the direction of the length of the rod, said clamp member being curved upwardly between its ends to effectively grip the rod and especially near such ends.

17. A fishing reel comprising a frame having a pair of spaced end members, one of which constitutes a gear housing, a spool disposed between said gear housing and the other end member, a crank on the outer side of said gear housing, means in said gear housing connecting said crank to said spool, cross members connecting said end members, the bottom cross member being connected to said other end member by a web constituting a counterbalance for said gear housing and parts associated therewith, and rod clamping means on said bottom cross member located near the center of gravity of the reel.

18. In a fishing reel of the character set forth, the combination of a spool shaft having a ratchet wheel thereon, a pawl coacting with said ratchet wheel and having a release member thereon projecting alongside of said ratchet wheel, a friction pad or member on the end of said release member in contact with said ratchet wheel, and a spring acting to urge said pawl in engagement with said ratchet wheel, the arrangement being such that the pawl is automatically disengaged from the ratchet wheel during the winding of the shaft and is automatically re-engaged when the winding is discontinued.

19. In a fishing reel of the character set forth, the combination of a spool shaft having a ratchet wheel thereon, a pawl coacting with said ratchet wheel and having a release member, a friction pad or member on said release member in contact with said ratchet wheel, and a spring acting to urge said pawl in engagement with said ratchet wheel.

20. In a fishing reel of the character set forth, the combination of a ratchet wheel and a pawl coacting therewith, a release member on said pawl in constant frictional contact with the side of said ratchet wheel for controlling the pawl relative to the ratchet wheel, and a spring acting to urge said pawl into engagement with the side of said ratchet wheel.

SAMUEL G. RUSSELL.
RALPH W. MILLER.